US007054644B2

(12) United States Patent
Heubel

(10) Patent No.: US 7,054,644 B2
(45) Date of Patent: *May 30, 2006

(54) INTERFERENCE PROTECTION FOR WIRELESS OFFICE SYSTEMS

(75) Inventor: Michael L. Heubel, Marietta, GA (US)

(73) Assignee: Jasper Wireless, LLC, Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 10/903,773

(22) Filed: Jul. 30, 2004

(65) Prior Publication Data
US 2005/0020261 A1    Jan. 27, 2005

Related U.S. Application Data

(63) Continuation of application No. 09/686,241, filed on Oct. 11, 2000, now Pat. No. 6,771,968.

(51) Int. Cl.
*H04B 1/38* (2006.01)
(52) U.S. Cl. .............. 455/454; 455/434; 455/444; 455/432.1; 455/436
(58) Field of Classification Search .............. 455/434, 455/444, 450, 451, 452.1, 464, 414.1, 560, 455/424, 561, 426.2
See application file for complete search history.

(56) References Cited

U.S. PATENT DOCUMENTS

| 6,466,793 | B1 * | 10/2002 | Wallstedt et al. ........... 455/450 |
| 6,542,741 | B1 * | 4/2003 | Wallstedt et al. ........... 455/434 |
| 6,594,258 | B1 * | 7/2003 | Larson et al. ............... 370/353 |
| 6,729,929 | B1 * | 5/2004 | Sayers et al. ............... 455/446 |
| 6,829,477 | B1 * | 12/2004 | Lu et al. .................. 455/426.1 |
| 2005/0003805 | A1 * | 1/2005 | Zaffino ..................... 455/414.1 |

* cited by examiner

*Primary Examiner*—Charles N Appiah
*Assistant Examiner*—Khawar Iqbal
(74) *Attorney, Agent, or Firm*—Venable LLP; Jeffrey W. Gluck

(57) ABSTRACT

A system for preventing interference to a first network by a second network where the first network includes a first cell and one or more cells neighboring the first cell. The system includes a scanner for scanning the first network for identifying information associated with a neighboring cell. The network switching device associated with the first network is in communication with the scanner and receives information including a frequency allocated to the neighboring cell and transmits the information to the scanner. The system further includes a controller in communication with the scanner and a memory device coupled to the controller. The memory device includes a table having frequencies allocated for use by the any one of the neighboring cells and the controller retrieves the allocated frequencies stored in the table and bars the allocated frequencies from being used by the second network.

16 Claims, 8 Drawing Sheets

INTERFERENCE PROTECTION FOR WIRELESS OFFICE SYSTEMS

CROSS REFERENCE TO RELATED APPLICATION

This application is a continuation of U.S. patent application Ser. No. 09/686,241 filed Oct. 11, 2000 now U.S. Pat. No. 6,771,968.

STATEMENT REGARDING FEDERALLY SPONSORED RESEARCH AND DEVELOPMENT

Not Applicable.

BACKGROUND

1. Technical Field

The claimed invention relates generally to telecommunications. More particularly, the claimed invention relates to a system, method and apparatus for interference protection in a telecommunications system.

2. Description of Related Art

Generally, wireless office systems (WOS) and more particularly digital wireless office systems (D-WOS) are well known in the art. Such wireless office systems can either stand-alone or are adjuncts to private-branch exchanges (PBXs). (WOS and D-WOS will be referred to as WOS hereinafter.) A PBX is a private telephone switch serving several extensions for establishing end-to-end connectivity among users, supervising the communication circuit and tearing down a communication path upon terminating or disconnecting a call. The PBX system is generally used as a corporate voice network within one building or several buildings situated on a campus. Communications are generally handled between users within the PBX system or between the PBX system and the public switched telephone network (PSTN) including mobile telephone wireless networks.

The WOS converts a PBX extension into a mobile phone extension such that a user with a mobile telephone can carry on communications with the mobile telephone. Accordingly, the WOS performs communication hand-offs between general-purpose mobile wireless communication networks (the macro-network hereinafter) and the WOS (and vice-versa) while the user moves about into and out of the building or campus that houses the PBX system. The user also can use the mobile telephone over a limited outdoor campus area, for example. However, because the WOS operates on wireless communication principles, there is an inherent tendency for such systems to interfere with the macro-network because the WOS can use the same frequencies, or channels, as ones that are allocated to the macro-network.

Generally, the WOS uses frequencies on the wireless frequency spectrum that are unused. A wireless office scanner is used to select a communication channel from the unused frequencies on the wireless spectrum. The scanner scans for frequencies that are used by the macro-network and deems such frequencies as unusable by the WOS. However, although the scanners are employed in order to prevent interference with the macro-network, in the event that the scanner should fail, the channels that were deemed unusable by the scanner would be put back in service. In other words, related art WOSs rely on the operation of the scanner to continuously provide a useable frequency spectrum to the WOSs. Accordingly, in a WOS deployment there exists the potential for interference by the WOS to the macro-network if the same frequencies are used by the WOS and the macro-network. Therefore, in the event the scanner becomes defective and fails to scan for local frequencies being used by the macro-network, the WOS will reuse any available frequencies. Related art methods, systems and apparatuses provide some protection by manually removing certain channels from use by the WOS. However, the manual process is labor intensive and, with the introduction of automated channel allocation (ACA), the manual process becomes increasingly more difficult and impractical to use.

Therefore, there is a need to provide a method, system and apparatus to mitigate the potential interference to the macro-network in the event of a catastrophic failure of a WOS scanner. Furthermore, there also is a need to provide a method, system and apparatus to communicate between a WOS and a macro-network for gathering information about macro-network channel reuse within a geographic area in proximity of a building or campus utilizing a WOS. Such information would be useful in determining which frequencies are being used by the macro-network and then removing such frequencies from service so as not to be used by the WOS.

SUMMARY

According to one aspect the invention provides a system for preventing interference to a first network including a first cell and at least one cell neighboring the first cell by a second network. The system includes a scanner for scanning the first network for identifying information associated with the at least one neighboring cell. The system also includes a network switching device associated with the first network in communication with the scanner, wherein the network switching device is for receiving information including a frequency allocated to the at least one neighboring cell and transmitting the information to the scanner. The system further includes a controller in communication with the scanner and a memory device coupled to the controller having a table stored therein, wherein the table includes frequencies that are allocated for use by the at least one neighboring cell, wherein the controller retrieves the allocated frequencies stored in the table and bars the allocated frequencies from being used by the second network.

According to another aspect the invention provides a wireless office system residing within a first cell of a first wireless network having an apparatus for preventing interference to the first wireless network by the wireless office system, the first wireless network including at least one cell neighboring the first cell. The wireless office system includes a scanner for scanning the first wireless network for identifying information associated with at least one neighboring cell. The wireless office system also includes a network switching device associated with the first wireless network in communication with the scanner, wherein the network switching device is for receiving information including a frequency allocated to the at least one neighboring cell and transmitting the information to the scanner. The system further includes a controller in communication with the scanner and a memory device coupled to the controller having a table stored therein, wherein the table includes frequencies stored therein that are allocated for use by the at least one neighboring cell, wherein the controller retrieves the allocated frequencies stored in the table and bars the allocated frequencies from being used by the wireless office system.

BRIEF DESCRIPTION OF THE DRAWINGS

Referring now to the drawings in which like reference numbers represent corresponding parts throughout, where.

DETAILED DESCRIPTION

Figure 1:
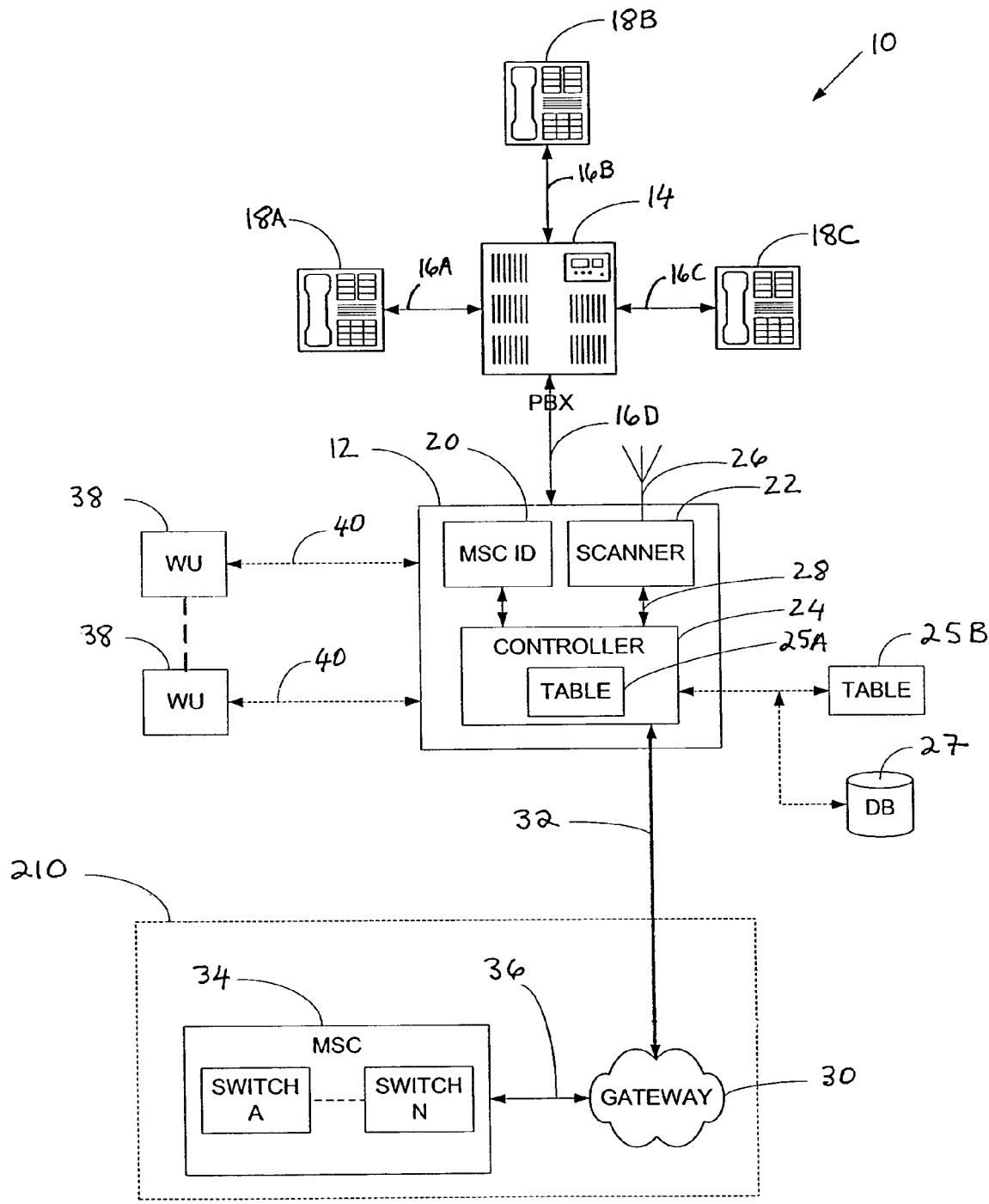
FIG. 1 illustrates one embodiment of one operating environment for a wireless office system.

In the following description of the specific embodiments of the claimed invention, reference is made to the accompanying drawings which form a part hereof and which is shown by way of illustration the specific embodiments in which the claimed invention may be practiced. In the accompanying drawings, like reference numbers represent corresponding parts throughout the several views. It is to be understood that other embodiments may be utilized as structural changes may be made without departing from the scope of the claimed invention. Wireless Office Systems and Digital Wireless Office Systems (WOS) can either be stand-alone or operate as adjuncts to PBX communication systems, which are generally well known in the art. The WOS can be implemented on a UNIX or IBM PC-based platform operating in a similar fashion to a network server, for example. Generally, the WOS operates by scanning for available frequencies/channels within a given geographic region. Such frequencies/channels are then barred or removed from the WOS to avoid interfering with the operation of local macro-network telecommunications systems.

The WOS utilizes a scanner for continuously scanning the local environment for available frequencies/channels in order to determine which frequencies/channels are available for use by the WOS at any given time. If, however, the WOS scanner suffers a failure, the WOS will attempt to use any available frequencies/channels of communication for the wireless mobile units associated with the WOS. Without the scanner, the WOS will generally use any frequencies/channels regardless of whether such frequencies/channels will interfere with the macro-network. Accordingly, the claimed invention provides a method, system and apparatus for preventing the WOS from using frequencies/channels that can potentially interfere with the operation of the macro-network.

The WOS provides several features that permit this type of interference protection. First, the WOS allows the wireless mobile units to reselect frequencies/channels on the macro-network by measuring certain parameters associated with a Digital Control Channel (DCCH hereinafter) of any macro-network cells neighboring a cell that includes a WOS. The measured parameters include the macro-network cell's FCC channel number, measured signal strength and the Digital Verification Color Code (DVCC hereinafter) along with other information that may be available from specific macro-network cells.

Second, the WOS can provide an Interim Standard 41 (IS-41 hereinafter) link to the Signaling System 7 (SS7 hereinafter) network. It will be appreciated by those skilled in the art that the IS-41 standard and the SS7 system and their operation are well known. Accordingly, such a link can provide information to the WOS regarding the location and status of wireless mobile units that are used to communicate within the WOS environment. In accordance with the claimed invention, such features of the WOS can be modified in order to support interference protection of the macro-network in the event that the WOS scanner suffers a failure and is no longer capable of scanning for frequencies/channels in order to remove them from use by the WOS.

Turning now to FIG. 1, where one embodiment of one operating environment of a WOS 12 is illustrated generally at 10. The WOS 12 interfaces with a conventional PBX system 14 by way of extension 16D. In addition to the WOS 12, telephones 18A, 18B, 18C and other communication devices also can be coupled to the PBX 14. It will be appreciated by those skilled in the art that each communication device coupled to the PBX system 14 such as the telephones 18A, 18B and 18C and the WOS 12 are provided with unique extensions 16A, 16B, 16C and 16D, respectively. It will be appreciated that the PBX system 14 can support one or more WOSs 12, without departing from the scope of the claimed invention. Furthermore, it will be appreciated by those skilled in the art that the WOS 12 can stand-alone without the PBX 14, without departing from the scope of the claimed invention.

In one embodiment of the claimed invention, the WOS 12 includes a switch identification portion 20, a scanner 22 and a controller 24. The switch identification portion 20 identifies the switch serving the WOS 12.

The scanner 22 scans local frequencies/channels being used by the macro-network cells. Such frequencies/channels can be detected by way of antenna 26, for example. The scanner 22 communicates with the controller 24 by way of communication link 28. It will be appreciated by those skilled in the art that scanners 22 and controllers 24 for the WOS 12 can be made readily available and purchased from, for example, ERICSSON, AGCS (LUCENT TECHNOLOGIES) and HUGHES NETWORK SYSTEMS. The communication method used by each scanner 22 and controller 24 pair is generally kept as proprietary information and is specific to the manufacturer of such devices. In one embodiment of the claimed invention, the scanner 22 is capable of scanning an entire band of frequencies/channels in about two minutes. The scanner 22 continuously repeats the scanning process.

The controller 24 is in communication with a telecommunication gateway 30 associated with the macro-network 210 by way of a communication link 32. In turn, the gateway 30 is in communication with a telecommunication switch 34 associated with the macro-network 210 by way of another communication link 36. It will be appreciated by those skilled in the art that the gateway 30 represents any suitable entrance and exit mechanism into the telecommunications macro-network 210. In one embodiment of the claimed invention the gateway 30 is an SS7 network.

The communication link 32 between the WOS 12 and the gateway 30 can be implemented using any known communication transport mechanism. A dial up modem that supports networking protocols for providing communication across interconnected networks can be used as the transport mechanism, for example. A dial-up modem that can provide communication between one or more networks of computers having different architectures running under different operating systems also can be used to implement the communication link 32, for example. Information is transferred across the communication link 32 between the WOS 12 and the gateway 30 by way of a network protocol. One example of a network protocol that can be used is the Transmission Control Protocol/Internet Protocol (TCP/IP hereinafter), which is a generally well-known robust protocol that has been adopted by the telecommunications industry. The TCP/IP is commonly used as an Internet Protocol or to provide a client server application platform. The gateway 30 converts the TCP/IP protocol information received from the controller 24 into an SS7/IS41 message, which is provided to a telecommunication switch 34. Accordingly, information from the WOS 12 is communicated to the telecommunication switch 34.

It will be appreciated by those skilled in the art that the telecommunication switch 34 serving the WOS 12 can be a Mobile Switching Center (MSC hereinafter). MSCs are generally well known in the art and can be purchased from various manufacturers of telecommunication switching equipment. For example, LUCENT TECHNOLOGIES manufactures telecommunication switches known as AUTOPACE® and ERICSSON manufactures telecommunication switches known as OXS®.

Wireless mobile units 38 such as wireless telephones, mobile telephones, cellular telephones and the like, can be used as communication devices within the WOS 12. Accordingly, such wireless mobile units 38 can communicate with the WOS 12 using various frequencies/channels 40, which are not being utilized by the macro-network 210. The scanner 22 determines which frequencies/channels that the WOS 12 is not to use such that they do not interfere with communications on the macro-network 210.

A table 25 is provided in order to store either or both the scanned frequencies/channels and the banned frequencies/channels. The table 25A can reside within the WOS 12. For example, the table 25A can be a memory or storage device associated with the controller 24. It will be appreciated that the table 25B can be located remote from the WOS 12 without departing from the scope of the claimed invention. Furthermore, the table 25 can be stored in a database 27 that is in communication with the WOS 12.

Figure 2:
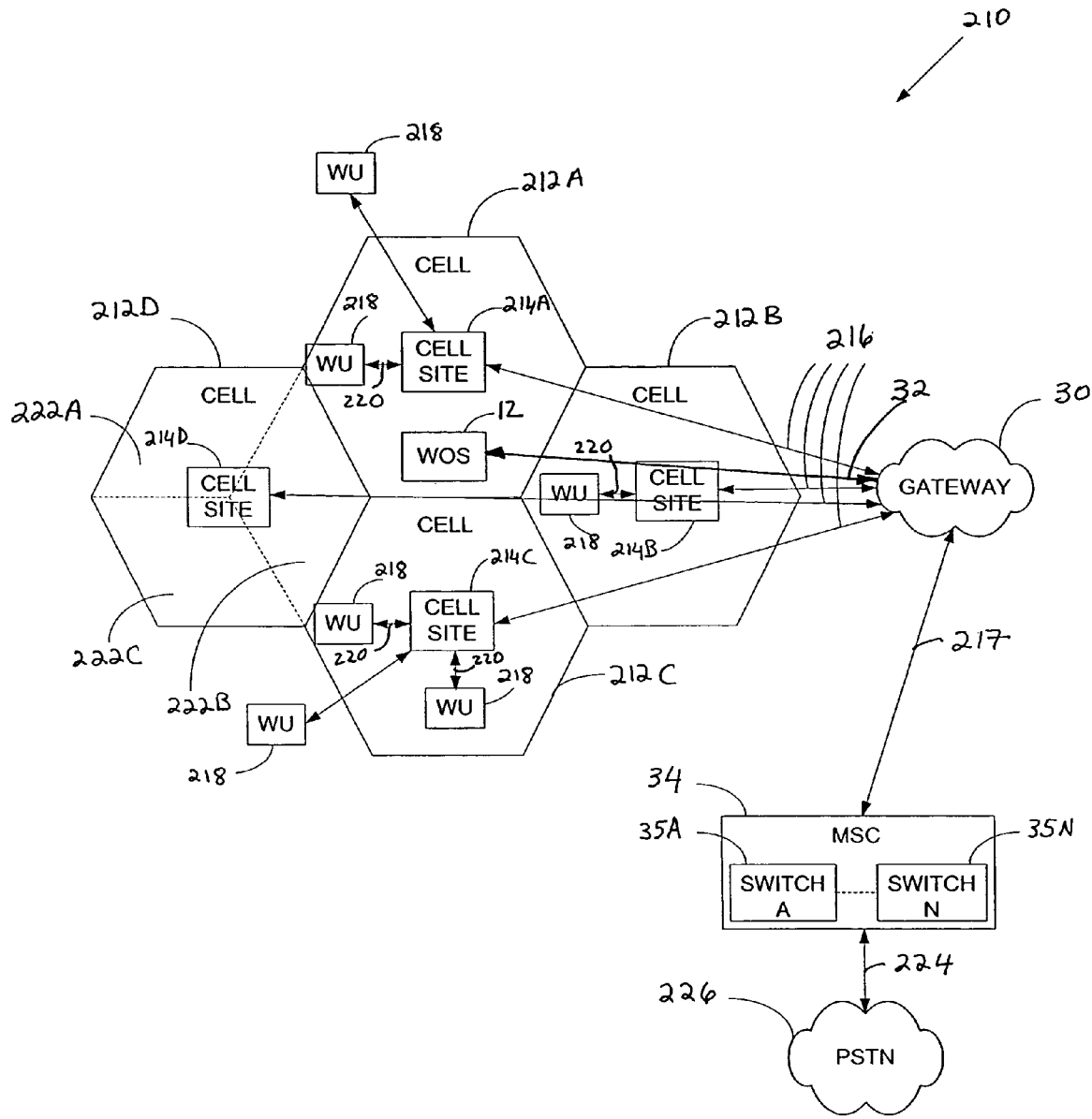
FIG. 2 illustrates one embodiment of a macro-network telecommunication system with a wireless office system interfaced thereto.

Turning now to FIG. 2, where one embodiment of a macro-network telecommunications system is shown generally at 210. The macro-network 210 is illustrated having the WOS 12 interfaced thereto. The macro-network 210 is comprised of individual macro-network cells 212 (cells hereinafter). It will be appreciated by those skilled in the art that the illustrated representation of the macro-network 210 is ideal in nature. In an actual real world implementation the cells 212A, 212B, 212C and 212D generally would not be identical in size and shape. Rather, in a real world implementation the geographic limitations of the terrain surrounding each cell site 214 and specific usage patterns associated with each cell site 214 will dictate the actual size and symmetry of the corresponding cells 212. Nevertheless, for illustration purposes, the ideal representation of the macro-network 210 is generally one that has been well accepted by the telecommunications industry.

Each cell 212 in the macro-network includes a cell site 214. Each cell site 214 interfaces with the gateway 30, which in turn interfaces with the telecommunication switch 34 by way of communication links 216 and 217, respectively. The switch 34 interfaces to the Public Switched Telephone Network 226 (PSTN hereinafter) by way of communication link 224. The communication links between the cell site 214 and the telecommunication switch 34 can vary depending upon the specific installation. The telecommunication switch 34 is an intelligent piece of hardware and software that generally manages the communication traffic within and between each cell 212. It will be appreciated that the switch 34 can be a MSC, which manages and coordinates one or more switches 35A, 35N, for example. Any MSC 34 or switch 35A, 35N can be used as the serving switch for the WOS 12 residing within the cell 212A. Wireless units 218 are devices that are used to communicate between users and the respective cell sites 214 through various frequencies/channels 220 of the macro-network.

Those skilled in the art will appreciate that each cell 212 can be divided into separate sectors 222 and that each sector 222 can be assigned a certain number of frequencies/channels 220. For example, cell 212D is illustrated as being divided into three separate sectors 222A, 222B and 222C. Each sector 222 can include a control frequency/channel and up to 42 additional frequencies/channels. Accordingly, each cell 212 can include up to 120 or more frequencies/channels. Those skilled in the art will appreciate that neighboring cells 212 will generally not use the same frequencies/channels that are used in adjacent sectors 222 in order to minimize or eliminate the possibility of interference between the corresponding neighboring cells 212.

Figure 3A:
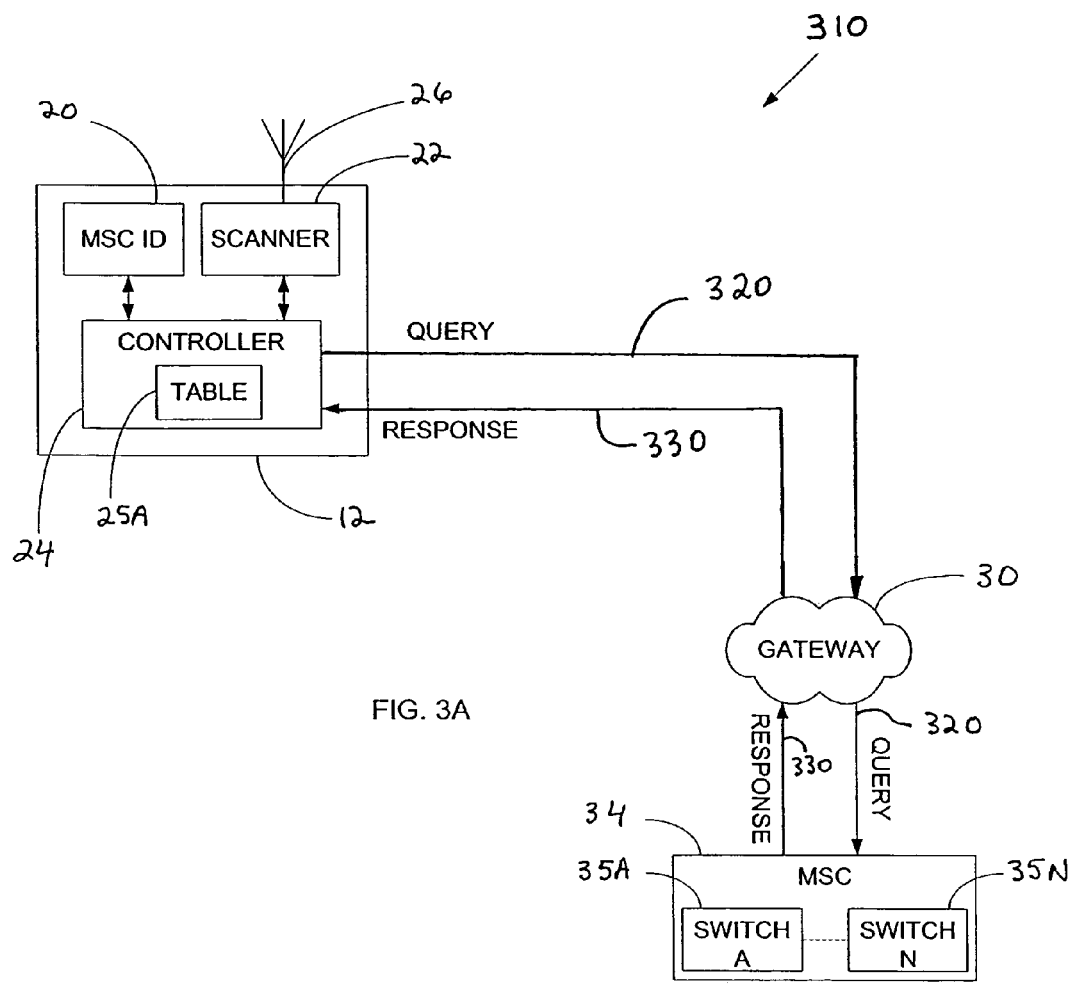
FIG. 3A illustrates one embodiment of a wireless office system and a mobile switching center interfaced by way of a gateway.

Turning now to FIG. 3A, a more detailed schematic representation of a system according to the claimed invention is shown generally at 310. The WOS 12 transmits a query 320 (FIG. 3B) through the gateway 30 and to the MSC 34. In turn, the MSC 34 transmits a response 330 (FIG. 3C) back to the WOS 12 through the gateway 30.

Figure 3B:
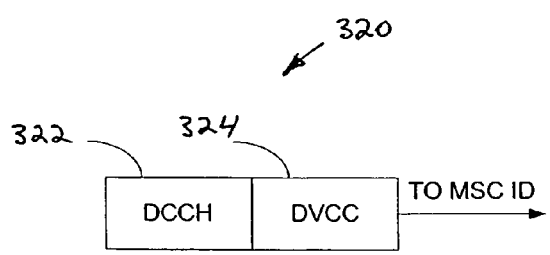
FIG. 3B illustrates one embodiment of a query.

FIG. 3B illustrates one embodiment of a query shown generally at 320. The controller 24 formulates the query 320 by including the DCCH 322 and DVCC 324 for a particular cell 212 of the macro-network 210. The query 320 is transmitted to the MSC 34 identified by the MSC ID 20.

Figure 3C:
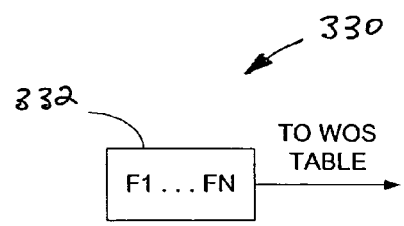
FIG. 3C illustrates one embodiment of a response.

FIG. 3C illustrates one embodiment of a response to the query 320 shown generally at 330. In accordance with the DCCH 322 and DVCC 324 for the cell 212, the MSC 34 transmits the response 330 to the controller 24. The response includes all frequencies 332 allocated to the cell 212 that the MSC is serving. It will be appreciated that the query 320 may be received by any one of the switches 35A, 35N being managed by the MSC 34.

Figure 4:
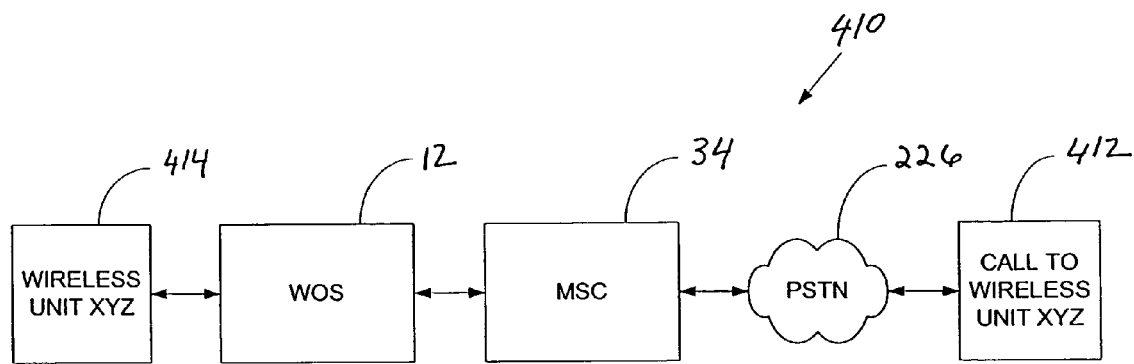
FIG. 4 illustrates one embodiment of a diagram of a call delivery system.

Turning now to FIG. 4, one embodiment of a call delivery system in accordance with the principles of the claimed invention is shown generally at 410. At block 412 a call is placed to wireless unit XYZ, represented by logic block 414, which is in communication with the WOS 12. In one embodiment of the claimed invention, the call 412 is routed through the PSTN 226 to the MSC 34 (or serving switch 35A, 35N). The MSC 34 routes the call to the WOS 12, which is then received by the wireless unit XYZ 414. In accordance with the claimed invention, the WOS 12 is banned from utilizing any frequencies/channels that the MSC 34 has reported as being in use by the macro-network 210 on any local or neighboring cells 212.

Accordingly, the WOS 12 continuously transmits queries 320 to the MSC 34 in order to obtain frequencies/channels that are being used by the cells 212, bars those frequencies/channels from being used within the WOS 12 and stores such frequencies/channels in a table 25 associated with the scanner 24. It will be appreciated that table 25A may reside anywhere within the WOS 12. Furthermore, table 25B may reside remotely from the WOS 12 whereby it can be accessed by way of well-known communications means. For example, the table 25B may reside in a database 27 associated with a database server that is remote from the WOS 12 and is linked to the WOS 12 by way of a communication network. Therefore, if the scanner 22 fails, the WOS 12 will retrieve the barred frequencies/channels from the table 25 and will know not to use such frequencies/channels to communicate with the wireless units 38.

Figure 5:
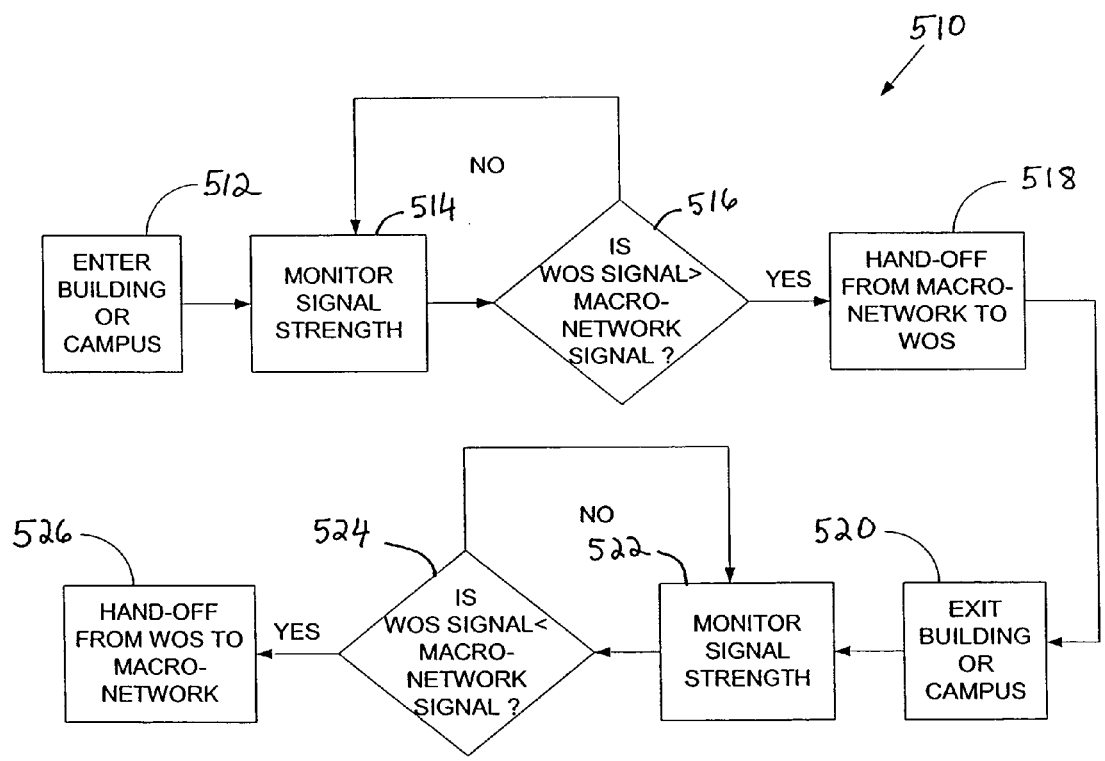
FIG. 5 illustrates one embodiment of a hand-off between a wireless office system and a macro-network and a hand-off between a macro-network and a wireless office system.

FIG. 5 illustrates one embodiment of a representation of a communication hand-off between the WOS 12 and the macro-network 210 and a communication hand-off between the macro-network 210 and the WOS 12 shown generally at 510. When the user is outside of a building or campus housing the WOS 12 installation, the user's wireless unit 38 is in communication with a specific cell sector 222. At block 512, however, as the user walks into the building or campus having the WOS 12 installation, the signal from the wireless unit 38 is sent through the TCP/IP-IS-41 gateway 30 of the particular cell site 214. At block 514 the signal strength from the wireless unit 38 is monitored. The signal is channeled through the voice trunks that are set up between the MSC 34 and the WOS 12. As the user approaches the building or campus the communication path will be switched from the weaker macro-network 210 signal to the stronger WOS 12 signal if at decision block 516 it is determined that the WOS 12 signal is stronger than the macro-network 210 signal. Block 518 represents the hand-off that occurs between the macro-network 210 and the WOS 12. Likewise, at block 520, as the user exits the building or campus a hand-off occurs at block 526 from the WOS 12 to the macro-network 210 if, at block 522, a stronger signal is detected from the macro-network 210 rather than the WOS 12. This determination is made as indicated at the decision block 524. It will be appreciated by those skilled in the art that the hand-off between the macro-network 210 and the WOS 12 occurs in a similar fashion as a hand-off would occur between two adjacent cells 212 in the macro-network 210.

Figure 6:
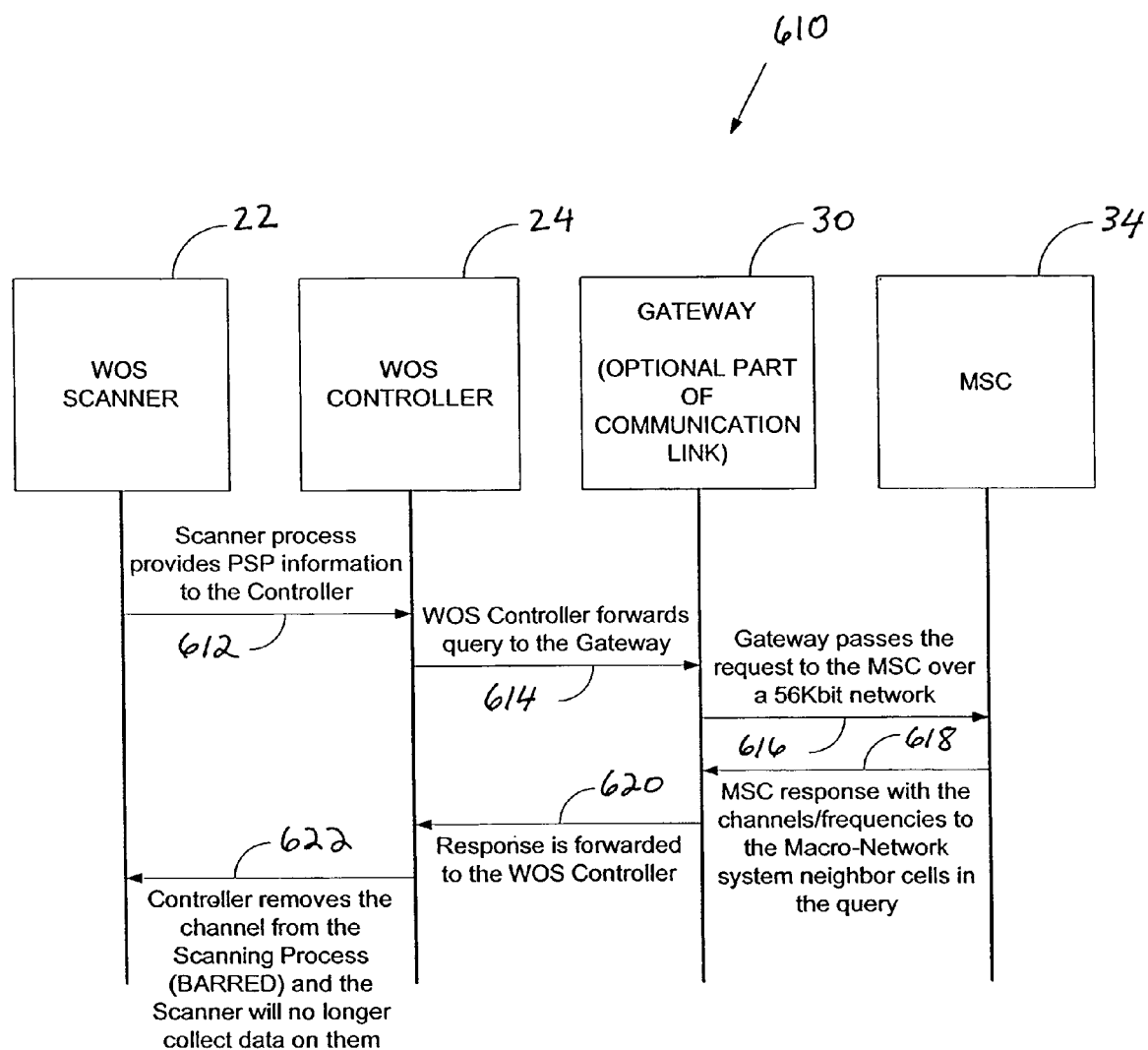
FIG. 6 illustrates one embodiment of a diagram of a messaging process.

Turning now to FIG. 6, one embodiment of a messaging and signaling process in accordance with the claimed invention is shown generally at 610. In one embodiment of the claimed invention, the principle proposed for mitigating interference potential to the macro-network 210 caused by the operation of the WOS 12 is to send the DCCH 322 and DVCC 324 information associated with each cell 212 to the MSC 34 in the form of a query 320. The MSC 34 looks up the information requested by the query 320 for each cell 212. In accordance with the query 320, the MSC 34 sends a response 330 to the WOS 12. The response 330 includes the frequencies/channels 332 allocated to the cells 212 B, C and D neighboring the cell 212A. Cell 212A is the cell wherein the WOS 12 resides. Once the WOS 12 receives the response 330 from the MSC 34, the WOS 12 stores the received macro-network 210 frequencies/channels 332 in a BARRED frequencies/channels table 25. As discussed above, the BARRED frequencies/channels table 25 is generally associated with the WOS controller 24. The BARRED table 25, however, can reside anywhere within the WOS 12 or can reside in a database 27, a database server or any other storage device that is in communication with the WOS 12. In this way, even if the scanners 22 suffer a catastrophic failure, the local frequencies/channels used by the cells 212 will not be moved into a frequencies/channels AVAILABLE table for the WOS 12. Accordingly, such frequencies/channels will not interfere with the operation of the macro-network 210.

Following is a description of the messaging that will generally occur during the messaging and signaling process 610. During the scanning process the scanner 22 collects data from the macro-network 210 cells 212B, 212C and 212D neighboring cell 212A, for example. The data collected during the scanning process can include cell site-specific information that can be used to identify the neighboring cells 212B, 212C and 212D. In one embodiment of the claimed invention the WOS 12 scans the neighboring cells 212B, 212C and 212D for each respective control frequency/channel DCCH 322, DVCC 324 and other information.

As indicated at step 612, the scanner 22 passes the information collected from the macro-network 210 to the controller 24 for further processing. Once the WOS controller 24 receives the data from the scanner 22, the controller 24 organizes and formats the data in the form of a query 320 to be sent to the MSC 34 (or a specific serving switch 35A, 35N), as shown at step 614, by way of the gateway 30 or any other suitable communications link. Further, as indicated at step 614, once the controller 24 is provided with the switch identifier information, the controller 24 formats the query 320 for the identified MSC 34 and sends the query 320 over the macro-network 210, through the gateway 30 (e.g., the SS7 network) and to the MSC 34. During this process, the controller 24 organizes the DCCH 322 based on measured signal strength. The switch identifier 20 can be provided to the controller 24 by various means. For example, it can be entered manually, the scanner 22 can detect it or it can be provided by way of a separate communication frequency/channel.

As shown at step 616, the gateway 30 passes the query 320 to the MSC 34 over a 56 Kbit network, for example. Thus, the query 320 generated by the controller 24 is communicated to the MSC 34. The communication between the WOS 12 and the MSC 34 can be accomplished in a variety of methods. In one embodiment of the claimed invention the communication can be accomplished by way of a dedicated link between the WOS 12 and the MSC 34. The dedicated link can take the form of a plain old telephone service (POTS) line or a dedicated 56 Kbit line, for example. In one embodiment of the claimed invention the communication can be accomplished by way of a transport that is capable of transmitting information through the gateway 30. It will be appreciated that the transport link and the associated IS-41 messages may require some modification in order to support the query 320 coming from the controller 24 and the response 330 from the MSC 34; however, this should in no way limit the scope of the claimed invention.

In either scenario, the WOS 12 will periodically send the query 320 requests to the MSC 34 to receive an update of the frequencies/channels 332 being used by the macro-network 210 for the cell 212 associated with the DCCH 322 and the DVCC 324. It will be appreciated by those skilled in the art that the period between updates can be a parameter that is set by the macro-network 210 service provider. In one embodiment of the claimed invention, the query 320 requests can be provided to the MSC 34 if the information regarding the neighboring cells 212B, 212C and 212D collected by the scanner 22 happens to change. For example, if the scanner 22 detects a change in a scanned parameter, such as a change in frequency/channel or a change in signal strength associated therewith in the neighboring cells 212B, 212C and 212D. Also, for example, if the scanner 22 detects a change in the neighboring cell's 212B, 212C and 212D DCCH 322. Accordingly, on identifying the change, the controller 24 formulates a query 320 to send to the MSC 34. Such query 320 requests will generally include a request for information associated with all of the neighboring cells 212B, 212C, 212D and not just the new DCCH 322.

In one embodiment of the claimed invention the information provided in the query 320 includes the DCCH 322 of the macro-network's 210 neighboring cells 212B, 212C and 212D, the corresponding DVCC 324 and the MSC identifier 20 that identifies the MSC 34 or the serving switch 35A, 35N that services the cell 212A wherein the WOS 12 is located. The serving switch identifying information can be a user-defined parameter that is set during the installation of the WOS 12. Also included in the query 320 can be information regarding the number of neighboring cells 212B, 212C and 212D. The number of neighboring cells can generally be included as a translatable parameter set by the macro-network 210 service provider.

The DCCH 322 value that is included within the query 320 can generally be derived or generated based upon the strongest signal strength as measured by the scanner 22 within the geographic proximity of the WOS 12 and can generally be limited to the number of neighboring cells 212B, 212C and 212D set by the macro-network 210 service provider. In one embodiment of the claimed invention the information can be formatted in a comma delimited form or can be formatted as a modified IS-41 message without departing from the scope of the claimed invention. Once the information is routed through the cell site 214, through the gateway 30 and to the MSC 34, the MSC 34 determines which control frequency/channel to associate with which DVCC 324 for a particular cell 212.

It will be appreciated by those skilled in the art that the MSC 34 can be used to manage all of the frequencies/channels used by the cell sites 214 located within the cells 212. Therefore, once the MSC 34 determines which cell 212 the query 320 has requested information for, it provides to the controller 24 the information regarding the frequencies/channels 332 being used by that particular cell 212. Accordingly, once the MSC 34 determines the appropriate cell 212, the WOS 12 can request that the MSC 34 download to the WOS 12 all of the frequencies/channels 332 associated with that particular cell 212. As discussed above, in accordance with the claimed invention, at the time the WOS 12 is installed an identifier 20 associated with the MSC 34 or switch 35A, 35N that serves certain specific cells 212 can be preprogrammed into the WOS 12. In this manner the information pertaining to the switch identifier 20 is provided to the controller 24. In turn, the controller 24 provides the frequencies/channels in use to the scanner 22. Accordingly, the scanner 22 no longer scans such frequencies/channels. Thus, the wireless units 38 will not use such frequencies/channels for communicating with the WOS 12. Furthermore, such frequencies/channels are written and stored to the table 25 to be retrieved by the WOS 12 in case of scanner 22 failures.

It will be appreciated by those skilled in the art that the WOS 12 can send queries 320 to the MSC 34 by way of a batch method such that all of the queries 320 for the neighboring cell 212B, 212C and 212D are transmitted at once. Or, the queries 320 can be sent individually for each cell 212. Either method is suitable for obtaining the frequencies/channels 332 that are currently in use by each of the cells 212 in the macro-network 210.

Steps 618, 620 and 622 illustrate the MSC 34 response 330 to the WOS 12 query 320. The MSC 34 can handle either type of request described above. At step 618 the MSC 34 evaluates the query 320 messages and determines the correct serving switch 35A, 35N from which to draw the information requested by the WOS 12. Once the appropriate serving switch 35A, 35N is determined, the switch 35A, 35N looks up which cell 212 is associated with the DCCH /DVCC pair provided in the query 320. Once the corresponding cell 212 is identified, the selected switch 35A, 35N pulls the frequency channel allocation data for that cell 212 and formats the data into a response 330 that is readable by the WOS 12. At step 620 the response is sent to the WOS 12 by way of the various communication links discussed above. The selected switch 35A, 35N then formulates its response 330 into a series of responses, one for each cell 212 requested in the query. Or, the selected switch 35A, 35N can formulate one response 330 for all of the cells 212 identified in the query.

At step 622, once the WOS 12 receives the response 330 from the selected switch 35A, 35N, the controller 24 will read the frequencies/channels 332 listed in the response 330 and BAR them from service. Depending on the specific implementation, the WOS 12 can support either the single cell response or multiple cells response from the selected switch 35A, 35N. After the controller 24 has removed the identified frequencies/channels 332 from service, it sends a command to the scanner 22. The command tells the scanner 22 not to scan the BARRED frequencies/channels. In this manner, the scanner 22 is able to operate at higher efficiencies because it only needs to scan the frequencies/channels that remain in the scanning pool.

Figure 7:
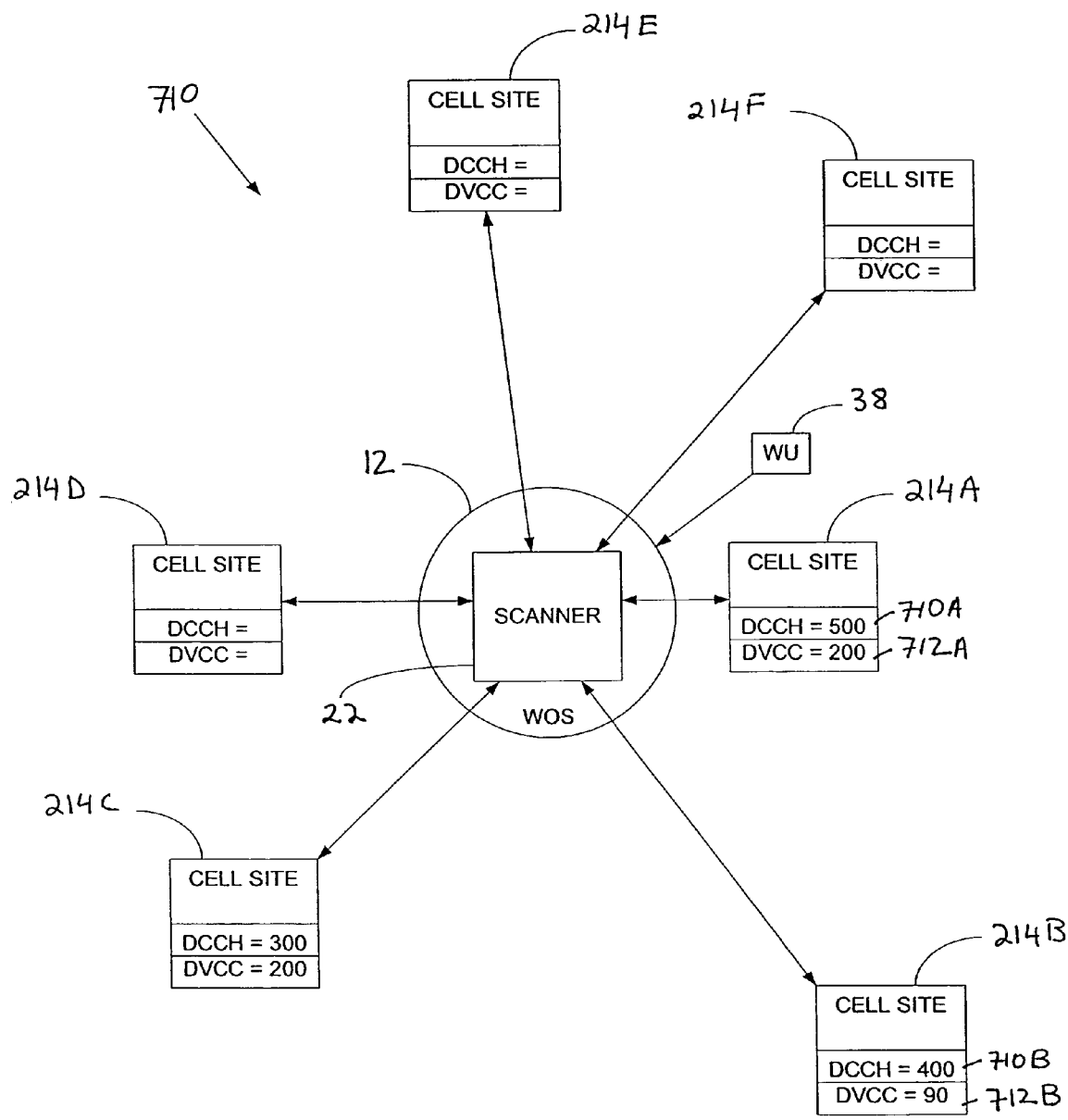
FIG. 7 illustrates one embodiment of a wireless office system interfaced to a macro-network.
Figures 8, 9:
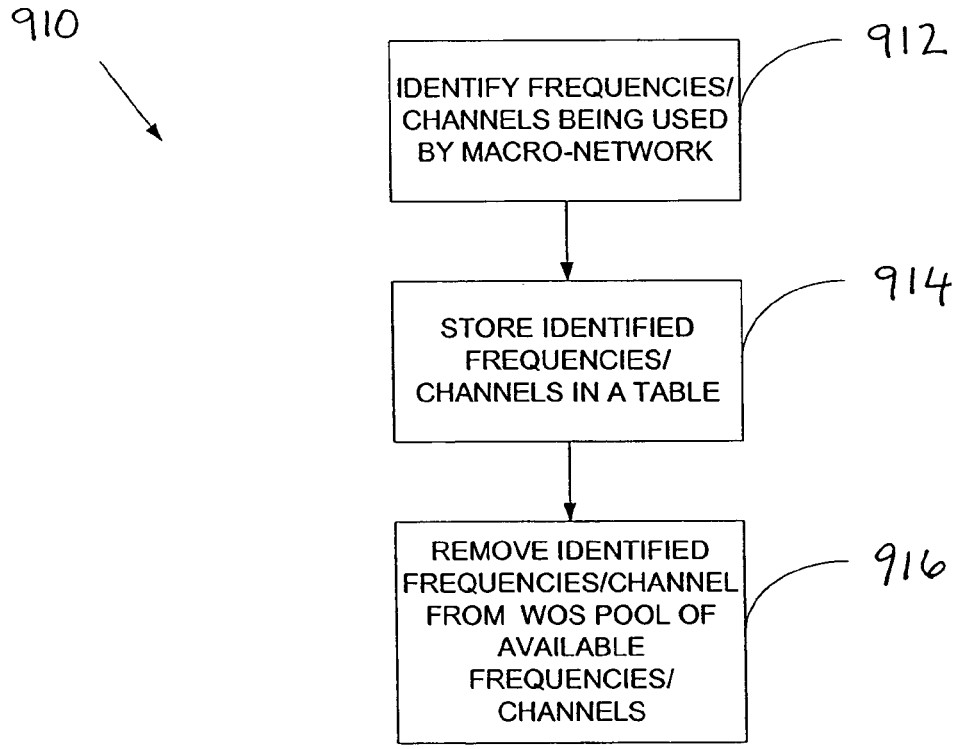
FIG. 8 illustrates one embodiment of a table.
FIG. 9 illustrates one embodiment of a logic flow diagram in accordance with the claimed invention.
Figure 10:
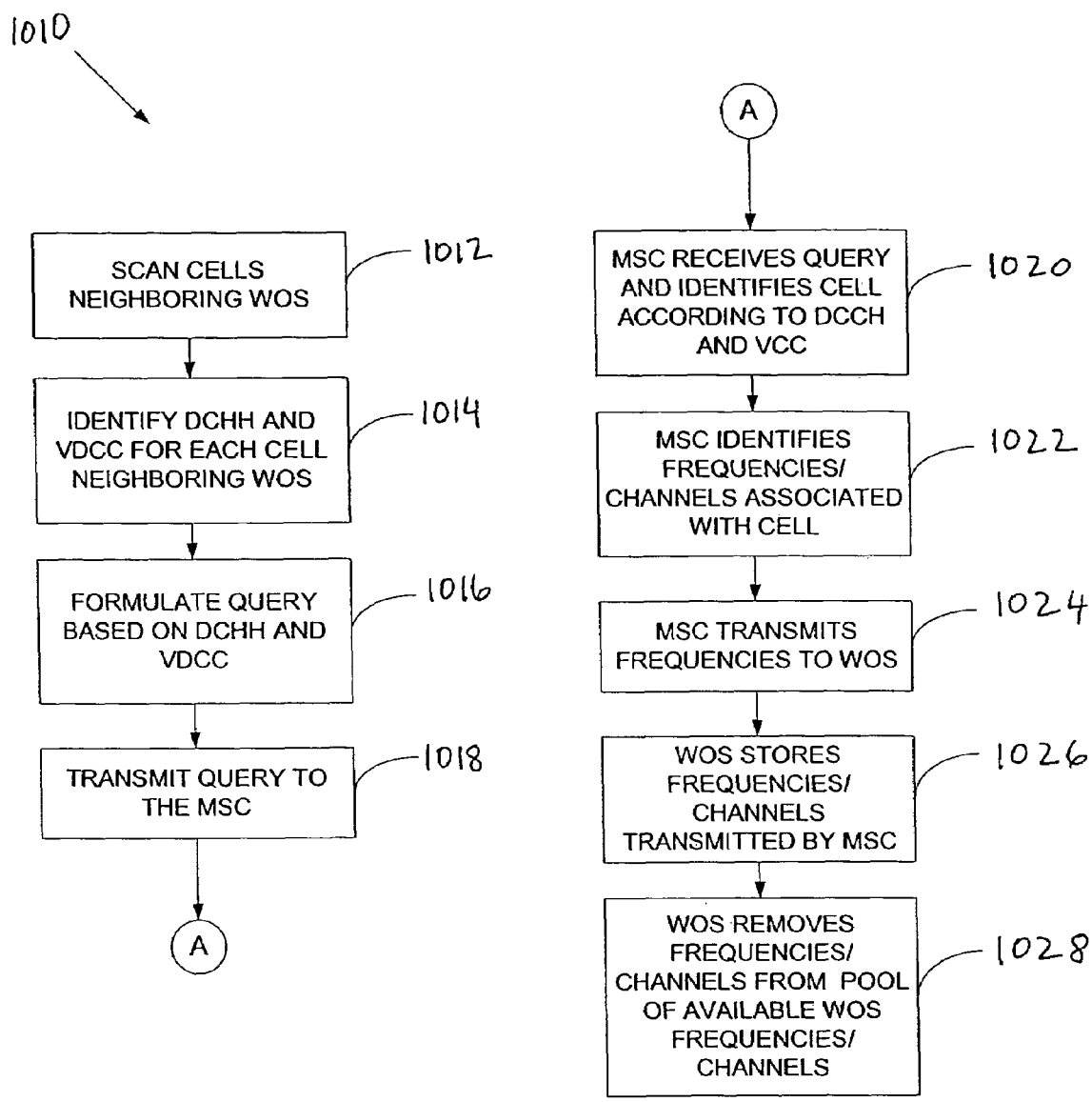
FIG. 10 illustrates one embodiment of a logic flow diagram in accordance with the claimed invention.

Turning now to FIG. 7 where one embodiment of a simplified diagram of the WOS 12 interfaced with the macro-network 210 in accordance with the claimed invention is illustrated generally at 710. With the scanner 22, the WOS 12 scans the surrounding cell sites 214 for the values of the control frequencies/channels associated with each cell site 214 in the entire band. The scanner 22 measures the signal strength of each control frequency/channel associated with each of the cell sites 214. For example, cell site 214A might have a control channel 710A (DCCH) of 500 assigned to it and a DVCC 712A of 200 assigned to it. Cell site 214B might have a DCCH 710B of 400 and a DVCC 710B of 90 and so on. A table of this information for each cell site 214 is created and is stored it in the WOS controller 24. It will be appreciated that this information can be included in table 25. The DCCH and the DVCC information gathered by the WOS scanner 22 is used to establish a relationship between the control frequency/channel for a specific cell site 214 and the information stored in the table 25 associated with the wireless unit 38 of the WOS 12. Accordingly, whenever the wireless unit 38 is provided with the DCCH/DVCC information it associates the information with a specific control frequency/channel being used for the WOS 12.

Furthermore, the WOS scanner 22 also scans for other frequencies/channels that are used throughout the macro-network 210. Accordingly, if the scanner 22 sees a value of 500 for the control frequency/channel of a cell site 214, it stores that control channel in a table within the WOS controller 24. If it sees other frequencies/channels, it stores those frequencies/channels in a "do not use" table within the WOS controller 24. Accordingly, in the event of a WOS scanner 22 failure, the WOS 12 will send a query to the MSC 34 and the MSC 34 replies with all the frequencies/channels 332 that are in use in a particular cell 212. Therefore, those frequencies/channels 332 will not be placed in the "okay-to-use" table despite a failure condition in the scanner 22.

Also, whenever the WOS 12 detects a change in a parameter associated with the macro-network 210, for example one of the frequencies/channels changes from a DCCH of 500 to a DCCH of 600, it can send a query 320 to the MSC 34 and obtain a fresh response 330 therefrom. The WOS 12 also can send queries 320 to the MSC 34 on a periodic basis if it has not detected any changes in frequencies/channels for a predetermined period. This predetermined period can be set at installation or reprogrammed as needed. Accordingly, when the predetermined period expires, the WOS 12 will send a new query 320 to the MSC 34 and receive fresh information therefrom by way of response 330.

Illustrated generally at 810 is one embodiment of the table 25. The table 25 can be organized as illustrated. For example, the cell site entries 812 can be associated with specific DCCH/DVCC entries 814. The cell site entries 812 and the corresponding DCCH/DVCC entries 814 can be further associated with the particular frequencies/channels entries 816 that represent the actual frequencies/channels currently in use by the cell site.

Illustrated generally at 910 is one embodiment of a logic flow diagram in accordance with one embodiment of the claimed invention. At logic block 912, the frequencies/channels in use by the macro-network 210 are identified. At block 914, the frequencies/channels that were identified in logic block 912 are stored in a table 25. At logic block 916, the frequencies/channels stored in the table 25 are removed from the pool of frequencies/channels available to the WOS 12.

Illustrated generally at 1010 is one embodiment of a logic flow diagram in accordance with one embodiment of the claimed invention. At logic block 1012 cells 212B, 212C and 212D neighboring scanner 22 scans the cell 212A wherein the WOS 12 is located. At logic block 1014 the DCCH/JVDCC is identified for each of the scanned neighboring cells 212B, 212C and 212D. According to the scanned information, at logic block 1016, the controller 24 formulates a query 320 to be transmitted to the MSC 34. At logic block 1018, the MSC 34 receives the query 320 and identifies the cell 212 based on the DCCH/JVDCC information included in the query 320. Upon identifying the cell 212, at block 1020, the MSC 34 identifies frequencies/channels that are allocated to the cell 212. Accordingly, at block 1022, the MSC 34 formulates a response 330 and transmits the response 330 to the WOS 12. Upon receiving the response 330, the WOS 12 stores the frequencies/channels 332 provided in the response by the MSC 34 into a table 25. Accordingly, the WOS 12 removes the frequencies/channels 332 stored in the table 25 from the pool of available frequencies/channels to be used by the WOS 12.

It will be appreciated by those skilled in the art that the claimed invention can provide a certain level of interference protection to the macro-network 210 should there be scanner 22 failures that occur in the WOS 12. The claimed invention also improves scanner 22 efficiencies by reducing the number of frequencies/channels that the scanner 22 is required to scan and measure. The claimed invention provides an increase in the number of scanning measurements per channel for the frequencies/channels remaining after the frequency/channel BARRING process. Thus the quality of the measurements and overall system performance is improved.

The foregoing description of the specific embodiments of the claimed invention has been presented for the purpose of illustration and description. It is not intended to be exhaustive or to limit the claimed invention to the precise form disclosed. Many modifications and variations are possible in light of the above teaching. It is intended that the scope of the claimed invention be limited not with the description above but rather by the claims appended hereto.

The claimed invention is:

1. A system for preventing interference to a first network including a first cell and at least one cell neighboring the first cell by a second network, the system comprising:
   a scanner to scan the first network to identify information associated with the at least one neighboring cell;
   a network switching device associated with the first network in communication with the scanner;
   wherein the network switching device is to receive a query from said second network, the query to request information about the at least one neighboring cell, to receive information including a frequency allocated to the at least one neighboring cell and to transmit the information to the scanner;
   a controller to communicate with the scanner; and
   a memory device coupled to the controller having a table stored therein, wherein the table includes frequencies stored therein that are allocated for use by the at least one neighboring cell;
   wherein, the controller is to retrieve the allocated frequencies stored in the table and to bar the allocated frequencies from being used by the second network.

2. The system according to claim 1, wherein further comprising a gateway to communicate with the controller via a modem.

3. The system according to claim 1, further comprising a gateway to communicate with the controller via a network protocol.

4. The system according to claim 3, wherein the network protocol is a TCP/IP network protocol.

5. The system according to claim 1, wherein the memory device further comprises a storage device to communicate with the scanner.

6. The system according to claim 5, wherein the storage device further comprises a database to communicate with the second network.

7. The system according to claim 5, wherein the storage device is to communicate with the first network.

8. The system according to claim 1, further comprising a telecommunication gateway associated with the first network to communicate with the controller.

9. The system according to claim 8, wherein the gateway includes an SS7 network.

10. The system according to claim 9, wherein the controller is to communicate with the SS7 network via an IS-41 link.

11. The system according to claim 10, wherein the gateway is adapted to translate TCP/IP messages into SS7 IS-41 messages.

12. The system according to claim 11, wherein the controller is to communicate with a telecommunication switch associated with the first network.

13. The system according to claim 12, wherein the telecommunications switch is a mobile switching center.

14. A wireless office system residing within a first cell of a first wireless network having an apparatus for preventing interference to the first wireless network by the wireless office system, the first wireless network including at least one cell neighboring the first cell, the system comprising:

a scanner to scan the first wireless network to identify information associated with the at least one neighboring cell;

a network switching device associated with the first wireless network to communicate with the scanner;

wherein the network switching device is to receive a query from said wireless office system, the query to request information about the at least one neighboring cell, to receive information including a frequency allocated to the at least one neighboring cell and to transmit the information to the scanner;

a controller to communicate with the scanner; and a memory device coupled to the controller having a table stored therein, wherein the table includes frequencies stored therein that are allocated for use by the at least one neighboring cell;

wherein, the controller is to retrieve the allocated frequencies stored in the table and to bar the allocated frequencies from being used by the wireless office system.

15. A system for preventing interference to a first network including a first cell and at least one cell neighboring the first cell by a second network, the system comprising:

means for scanning the first network for identifying information associated with the at least one neighboring cell;

means for switching associated with the first network in communication with the means for scanning;

wherein the means for switching is to receive a query from said second network, the query to request information associated with at least one neighboring cell information including a frequency allocated to the at least one neighboring cell and to transmit the information to the means for scanning;

means for controlling the first network in accordance with the identifying information, wherein the means for controlling is also for communicating with the means for scanning; and means for storing coupled to the means for controlling having a table stored therein, wherein the table includes frequencies stored therein that are allocated for use by the at least one neighboring cell of the first network;

wherein the means for controlling is further retrieving the allocated frequencies stored in the table and for barring the allocated frequencies from being used by the second network.

16. A wireless office system residing within a first cell of a first wireless network having means for preventing interference to the first wireless network by the wireless office system, the first wireless network including at least one cell neighboring the first cell, the system comprising:

means for scanning the first wireless network for identifying information associated with the at least one neighboring cell;

means for switching associated with the first wireless network and for communicating with the means for scanning;

wherein the means for switching is for receiving information including a frequency allocated to the at least one neighboring cell and a query from the wireless office system, the query to request information about the at least one neighboring cell and transmitting the information to the means for scanning;

means for controlling the wireless office system in accordance with the identifying information, wherein the means for controlling is adapted for communicating with the means for scanning; and means for storing coupled to the means for controlling having a table stored therein, wherein the table includes frequencies stored therein that are allocated for use by the at least one neighboring cell of the first wireless network;

wherein the means for controlling is further for retrieving the frequencies stored in the table and for barring the allocated frequencies from being used by the wireless office system.

* * * * *